US007050999B1

(12) United States Patent
Ota

(10) Patent No.: US 7,050,999 B1
(45) Date of Patent: May 23, 2006

(54) SYSTEM FOR COMPUTING PROBABILITY DISTRIBUTION OF LOAN LOSSES

(75) Inventor: Hiroyuki Ota, Tokyo-To (JP)

(73) Assignee: Resona Holdings, Inc., Osaka (JP)

( * ) Notice: Subject to any disclaimer, the term of this patent is extended or adjusted under 35 U.S.C. 154(b) by 0 days.

(21) Appl. No.: 09/540,890

(22) Filed: Mar. 31, 2000

(30) Foreign Application Priority Data

Apr. 22, 1999 (JP) ................................. 11-115487

(51) Int. Cl.
*G06F 17/60* (2006.01)

(52) U.S. Cl. .................................. 705/37; 35/26; 35/7
(58) Field of Classification Search .................. 705/70, 705/30, 35–37, 42, 26
See application file for complete search history.

(56) References Cited

U.S. PATENT DOCUMENTS

| 4,953,085 | A | * | 8/1990 | Atkins ......................... | 705/36 |
| 5,148,365 | A | * | 9/1992 | Dembo ......................... | 705/36 |
| 5,732,397 | A | * | 3/1998 | DeTore et al. ................. | 705/1 |
| 5,911,135 | A | * | 6/1999 | Atkins ......................... | 705/36 |
| 5,911,136 | A | * | 6/1999 | Atkins ......................... | 705/36 |
| 5,920,848 | A | * | 7/1999 | Schutzer et al. .............. | 705/42 |

(Continued)

FOREIGN PATENT DOCUMENTS

| GB | 2030748 | A | * | 4/1980 |
| GB | 2159644 | A | * | 12/1985 |
| JP | 9-81640 | | | 3/1997 |
| JP | 10-504409 | | | 4/1998 |
| JP | 11-175602 | | | 7/1999 |
| WO | 96/05563 | | | 2/1996 |

OTHER PUBLICATIONS

Statistical and Financial Models of Insurance Pricing and the Insurance Firm article, j. David Cummins, 1991, 28 pages.*
Christopher C. Finger, Risk Metrics Group, "Conditional Approaches for Credit Metrics Portfolio Distributions," Credit Metrics Monitor, Apr. 1999, pp. 14-33.

(Continued)

*Primary Examiner*—Hani M. Kazimi
*Assistant Examiner*—Narayanswamy Subramanian
(74) *Attorney, Agent, or Firm*—Foley & Lardner LLP

(57) ABSTRACT

A system for computing probability distribution of loan losses includes a loan amount and bankruptcy probability input device for inputting loan amounts and bankruptcy probabilities of individual loan customers, a characteristic function calculating device for calculating a characteristic function from these loan amounts and bankruptcy probabilities. A probability distribution calculating device calculates probability distribution by Fourier transform inversion of the characteristic function, and a probability distribution output device outputs the calculated probability distribution as a graph through a printer.

7 Claims, 11 Drawing Sheets

U.S. PATENT DOCUMENTS

| | | | | |
|---|---|---|---|---|
| 5,966,700 | A | * | 10/1999 | Gould et al. .................. 705/38 |
| 5,987,436 | A | * | 11/1999 | Halbrook ..................... 705/38 |
| 6,078,903 | A | * | 6/2000 | Kealhofer .................... 705/36 |
| 6,119,103 | A | * | 9/2000 | Basch et al. .................. 705/35 |
| 6,173,276 | B1 | * | 1/2001 | Kant et al. .................... 706/50 |
| 6,233,566 | B1 | * | 5/2001 | Levine et al. ................. 705/37 |
| 6,513,018 | B1 | * | 1/2003 | Culhane ...................... 705/35 |
| 6,546,545 | B1 | * | 4/2003 | Honarvar et al. ........... 717/100 |
| 6,598,030 | B1 | * | 7/2003 | Siegel et al. .................. 705/38 |
| 6,658,393 | B1 | * | 12/2003 | Basch et al. ................. 705/38 |
| 2002/0010667 | A1 | * | 1/2002 | Kant et al. .................... 705/35 |
| 2002/0077793 | A1 | * | 6/2002 | Poncet ......................... 703/2 |
| 2002/0161677 | A1 | * | 10/2002 | Zumbach et al. ............ 705/35 |
| 2003/0088601 | A1 | * | 5/2003 | Pitsianis et al. ............ 708/622 |

OTHER PUBLICATIONS

Credit Suisse, "Credit Risk," pp. 3-68, 1997.

Greg M. Gupton et al., "CreditMetrics" Part I, II and III, J.P. Morgan, 1997.

Kei Takeuchi, "Mathematical Statistics," Feb. 5, 1986, pp. 5-67.

Tatsuo Kawada, "Fourier Analysis and Statistics," Oct. 5, 1985, pp. 95-141.

Mikio Morimune, "Risk Management, and Financial and Security Strategy," Mar. 19, 1998, pp. 3-35.

Kaoru Tone, "BASIC", Jul. 10, 1985, pp. 95-104.

Yukiharu Kurokawa, "Decision Standard for Loan and Subjective Judgement", Dec. 25, 1989, Mita syogaku kenkyu, vol. 32, No. 5, pp. 259-275.

Yasuhiko Morimoto et al., "Credit Risk Management by Using Decision Tree with Regional Rules", Oct. 14, 1998, Institute of Electronics, Information and Communication Engineers Technical Report, vol. 98, No. 316, pp. 1-8.

Kenji Nishiguchi et al., "Capital Allocation and Bank Management based on the Qualification of Credit Risk," Feb. 26, 1998.

Norio Hibiki et al., "Report of the Research Group on Risk Management Models," Jul. 1999.

Ou Keiho et al., "Credit Events, Losses & Pricing," May 23, 1997.

* cited by examiner

SYSTEM FOR COMPUTING PROBABILITY DISTRIBUTION OF LOAN LOSSES

BACKGROUND OF THE INVENTION

1. Field of the Invention

This invention relates to a computer technology for computing the probability distribution of loan losses which may emanate from the entire loans in a financing organization having a plurality of loan debtors on condition that the loaned amount to each loan customer and the bankruptcy probability of each customer are known.

2. Description of the Related Background Art

Each of financing organizations of larger scales, such as city banks, has as many as tens of thousand loan customers it finances. Focusing at one loan customer, there are expected two cases, namely, it will go into bankruptcy and it will not go into bankruptcy. That is, two possibilities of bankruptcy and non-bankruptcy can be expected for each loan customer. Therefore, when the probability distribution of loan losses emanating from the entire loaned sum is computed, the entire number of patterns or aspects of bankruptcy and non-bankruptcy will amount to a number as enormous as self multiplication of 2 over the times corresponding to the number of customers, that is, the tens of thousandth power of 2. Therefore, even when bankruptcy probabilities indicating probabilities of bankruptcy of individual loan customers and loan amounts to individual loan customers are already known, calculation must be done for all of such enormous patterns which are the tens of thousandth power of 2 (approximately one thousandth power of one trillion), and computation of probability distribution is actually impossible even when using a computer. That is, even by using computers, their computation load is too heavy to actually execute computation. Currently, therefore, there is no technology for precisely computing probability distributions of loan losses in this field.

Since no technology for accurately computing probability distributions of loan losses existed heretofore as explained above, a simulation method was employed to obtain probability distributions of loan losses. This simulation method was the technique of forecasting the probability distribution of the entire loan losses by extracting a part of the whole bankruptcy and non-bankruptcy, and calculating probability distributions of loan losses of these samples. That is, this was the method for selecting about ten thousands at random from patterns amounting the tens of thousandth power of 2, calculating an aspect of the probability distribution of loan losses of these selected patterns, and presuming the whole probability distribution of loan losses involving all of the patterns amounting to the tens of thousandth power of 2. A graph of a whole probability distribution of the loan losses obtained by this simulation method is shown in FIG. 12. As apparent from the graph of FIG. 12, this simulation method was not suitable for practical use because of large errors. That is, there was a problem that a probability distribution of one loan loss could not be obtained because of the low accuracy of the graph. In other words, there was a problem that it was not suitable for practical use because estimation errors were too large.

SUMMARY OF THE INVENTION

Taking those problems into consideration, it is an object of the invention to provide a computer technique for precisely computing probability distribution of loan losses which may occur from the entire loans when loan amounts to individual loan customers and bankruptcy probabilities of these loan customers are known. That is, it is the object of the invention to enable precisely obtaining probability distribution of loan losses of all loan customers or a group of loan customers of a financing organization and to enable precisely obtaining a probability density to which loan losses are likely to occur.

According to an aspect of the invention, there is provided a system for computing probability distribution of loan losses in a financing organization having a plurality of loan customers, comprising:

an input means for inputting loan amounts loaned to each loan customer and bankruptcy probabilities of each loan customer;

a characteristic function calculating means for calculating a characteristic function on the basis of each loan amount and each bankruptcy probability inputted through the input means;

a probability distribution calculating means for calculating a probability distribution by Fourier transform inversion of the characteristic function calculated by the characteristic function calculating means; and a probability distribution output means for outputting the probability distribution calculated by the probability distribution calculating means.

According to another aspect of the invention, there is provided a system for computing probability distribution of loan losses in a financing organization having a plurality of loan customers, comprising:

an acquiring means for acquiring rating fluctuation probabilities which are the probabilities of fluctuation in ratings of each loan customer, and credit value changing amounts which are changes in value of the credit to each loan customer caused by the fluctuation in the ratings thereof;

a characteristic function calculating means for calculating a characteristic function on the basis of each rating fluctuation probability and each credit value changing amount;

a probability distribution calculating means for calculating a probability distribution by Fourier transform inversion of the characteristic function calculated by the characteristic function calculating means; and a probability distribution output means for outputting the probability distribution calculated by the probability distribution calculating means.

According to a further aspect of the invention, there is provided a system for computing probability distribution of loan losses in a financing organization having a plurality of loan customers, comprising:

an input means for inputting loan amounts loaned to each loan customer and bankruptcy probabilities of each loan customer;

an actual loss calculating means for calculating actual losses which are amounts of the losses the financing organization may actually suffer when each loan customer goes into bankruptcy;

a characteristic function calculating means for calculating a characteristic function on the basis of the actual losses and the bankruptcy probabilities;

a probability distribution calculating means for calculating a probability distribution by Fourier transform inversion of the characteristic function calculated by the characteristic function calculating means; and a probability distribution output means for outputting the probability distribution calculated by the probability distribution calculating means.

According to a still further aspect of the invention, there is provided a system for computing probability distribution of loan losses in a financing organization having a plurality of loan customers, comprising:

a scenario acquiring means for acquiring a plurality of actual losses which are amounts of losses the financing organization may suffer when each loan customer goes into bankruptcy by predicting future fluctuations, and a plurality of bankruptcy probabilities of each loan customer by predicting future fluctuations, and using these values as a plurality of scenarios;

a characteristic function calculating means for calculating characteristic function for each scenario on the basis of the actual losses and the bankruptcy probabilities acquired by the scenario acquiring means;

a probability distribution calculating means for calculating probability distributions for each scenario by Fourier transform inversion of the characteristic function calculated by the characteristic function calculating means;

an average probability distribution calculating means for calculating an average probability distribution which is the average of the probability distributions for each scenario; and a probability distribution output means for outputting the average probability distribution calculated by the average probability distribution calculating means.

According to a yet further aspect of the invention, there is provided a system for computing probability distribution of loan losses in a financing organization having a plurality of loan customers, comprising:

a scenario acquiring means for acquiring a plurality of actual losses which are amounts of losses the financing organization may suffer when each loan customer goes into bankruptcy by predicting future fluctuations, and a plurality of bankruptcy probabilities of each loan customer by predicting future fluctuations, and using these values as a plurality of scenarios;

a characteristic function calculating means for calculating characteristic functions for each scenario on the basis of the plurality of actual losses and bankruptcy probabilities acquired by the scenario acquiring means;

a probability distribution calculating means for calculating probability distributions for each scenario by Fourier transform inversion of the characteristic function calculated by the characteristic function calculating means; and a probability distribution output means for outputting the probability distributions calculated by the probability distribution calculating means for each scenario.

According to a further aspect of the invention, there is provided a system for computing probability distribution of loan losses in a financing organization having a plurality of loan customers, comprising:

a scenario acquiring means for acquiring loan amounts of each loan customer and acquiring a plurality of bankruptcy probabilities of each loan customer by predicting future fluctuations, and then using these values as a plurality of scenarios;

a characteristic function calculating means for calculating characteristic functions for each scenario on the basis of the loan amounts and the bankruptcy probabilities acquired by the scenario acquiring means;

a probability distribution calculating means for calculating probability distributions for each scenario by Fourier transform inversion of the characteristic function calculated by the characteristic function calculating means;

an average probability distribution calculating means for calculating an average probability distribution which is the average of the probability distributions for each scenario; and a probability distribution output means for outputting the average probability distribution calculated by the average probability distribution calculating means.

According to a still further aspect of the invention, there is provided a system for computing probability distribution of loan losses in a financing organization having a plurality of loan customers, comprising:

a scenario acquiring means for acquiring loan amounts of each loan customer and acquiring a plurality of bankruptcy probabilities of each loan customer by predicting future fluctuations, and then using these values as a plurality of scenarios;

a characteristic function calculating means for calculating characteristic functions for each scenario on the basis of the loan amounts and the bankruptcy probabilities acquired by the scenario acquiring means;

a probability distribution calculating means for calculating probability distributions for each scenario by Fourier transform inversion of the characteristic function calculated by the characteristic function calculating means; and a probability distribution output means for outputting the probability distributions calculated by the probability distribution calculating means for each scenario.

According to a yet further aspect of the invention, there is provided a system for computing probability distribution of loan losses in a financing organization having N loan customers k=1 . . . N comprising:

an input means for inputting loan amounts $M_k$ to individual N loan customers k=1 . . . N and bankruptcy probabilities $p_k$ thereof;

a loan customer calculating means for calculating the number N of the loan customers on the basis of the loan amounts $M_k$ and/or the bankruptcy probabilities $p_k$ inputted by the input means;

a characteristic function calculating means for calculating a characteristic function $$\phi(t) = \prod_{k=1}^{N} \{1 + p_k(\exp(itM_k) - 1)\}$$

at each t of $t=2\pi m/(2^{2n})$ (m=0, 1, 2, . . . , $2^{2n}-1$) for the number of points n of Fourier transform;

a probability distribution calculating means for calculating a probability distribution by Fourier transform inversion of the characteristic function calculated by the characteristic function calculating means, by using a fast Fourier transform technique; and a probability distribution output means for outputting the probability distribution calculated by the probability distribution calculating means.

According to a yet further aspect of the invention, there is provided a method for computing probability distribution of loan losses in a financing organization having a plurality of loan customers, comprising:

an input process for inputting loan amounts loaned to each loan customer and bankruptcy probabilities of each loan customer;

a characteristic function calculating process for calculating a characteristic function on the basis of the loan losses and the bankruptcy probabilities;

a probability distribution calculating process for calculating a probability distribution by Fourier transform inversion of the characteristic function calculated by the characteristic function calculating process; and a probability distribution output process for outputting the probability distribution calculated by the probability distribution calculating process.

According to a yet further aspect of the invention, there is provided a recording medium storing a program for calculating a probability distribution of loan losses in a financing organization having a plurality of loan customers, in which the program comprising:

an input process for inputting loan amounts loaned to each loan customer and bankruptcy probabilities of each loan customer;

a characteristic function calculating process for calculating a characteristic function on the basis of the loan losses and the bankruptcy probabilities;

a probability distribution calculating process for calculating a probability distribution by Fourier transform inversion of the characteristic function calculated by the characteristic function calculating process; and a probability distribution output process for outputting the probability distribution calculated by the probability distribution calculating process.

DETAILED DESCRIPTION OF THE PREFERRED EMBODIMENTS

First Embodiment

The first embodiment of the invention is configured to first obtain a characteristic function of loan losses of the whole loan customers in a financing organization, relying on the feature that a probability distribution and a characteristic function are related by one-to-one in Fourier transform and Fourier transform inversion, and thereafter obtain the probability distribution of the whole loan losses by Fourier transform inversion of the characteristic function. This is explained below in greater detail.

Figure 1:
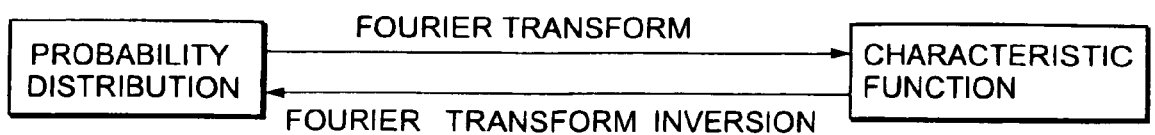
FIG. 1 is a diagram showing the relation between Fourier transform and Fourier transform inversion of a probability distribution and a characteristic function.

First referring to FIG. 1, explanation is made about the relation between Fourier transform and Fourier transform inversion related to the probability distribution and the characteristic function. FIG. 1 is a diagram showing a relation between Fourier transform and Fourier transform inversion of a probability distribution and a characteristic function.

As shown in FIG. 1, by Fourier transform of the probability distribution, the characteristic function is determined. In contrast, by Fourier transform inversion of the characteristic function, the probability distribution is determined. The embodiment shown here uses this relationship to first obtain a characteristic function of the entire loan losses and then obtain the probability distribution of the entire loan losses by Fourier transform inversion of the characteristic function obtained.

Next explained is a process for obtaining the probability distribution of the entire loan losses according to this embodiment.

Let the number of loan customers be N. That is, the number of loan customers for obtaining the probability distribution of loan losses is N. The number of loan customers N may be either the number of all loan customers of a certain financing organization or the number of all loan customers within a group of collected plural loan customers. $X_k$ is the random variable of bankruptcy ($X_k=1$) or non-bankruptcy ($X_k=0$) of a loan customer k. Here, k=1, 2, ... N. The bankruptcy probability which is the probability that the loan customer k goes into bankruptcy is $p_k$. Further, let the random variable $X_k$ be independent for each loan customer. That is, it is assumed that the probability that a certain loan customer goes into bankruptcy and the probability that another loan customer goes into bankruptcy are independent from each other. When the loan amount to the loan customer k is $M_k$ and the loan loss in the entire loan amount is L, distribution of the loan loss L in the entire loan amount can be expressed by Equation (1).

$$L = \sum_{i=1}^{N} M_i X_i \qquad (1)$$

Consider the characteristic function $\phi(t)$ of the loan loss L in the entire loan. Definition of the characteristic function $\phi(t)$ is characteristic function $\phi(t)=E[\exp(iLt)]$ where $i=\sqrt{-1}$, E is the expected value, and exp( ) is the exponential function having the base of a natural logarithm as its base. The characteristic function $\phi(t)$ can be developed as follows.

$$\phi(t) = E[\exp(iLt)]$$
$$= E\left[\exp\left(it\sum_{k=1}^{N} M_k X_k\right)\right]$$

Because of the independence, $$= \prod_{k=1}^{N} E[\exp(itM_k X_k)] \quad (2)$$

$$= \prod_{k=1}^{N} \{(1 - p_k) + p_k \exp(itM_k)\}$$

$$= \prod_{k=1}^{N} \{1 + p_k(\exp(itM_k) - 1)\}$$

From Equation (2), the characteristic function can be formulated.

Next consider a Fourier transform. Here is used fast Fourier transform (FFT) using a computer. By this FFT, when complex numbers are given for the values of the characteristic function φ(t) in $$t = \frac{2\pi m}{2^n} (m = 0, 1, 2 \ldots 2^n - 1) \quad (3)$$

then, Fourier transform inversion takes place, and the probability distribution f(L) of the loan loss L in the entire loan is computed. Here, m=0, 1, 2, ... $2^n$−1, and L=0, 1, 2, ... $2^n$−1. n is the parameter for determining the number of points Q for Fourier transform. That is, the number of points Q=$2^{2n}$. Therefore, by sequentially substituting Equation (3) into Equation (2), the probability distribution f(L) of the loan loss L can be computed.

Figure 2:
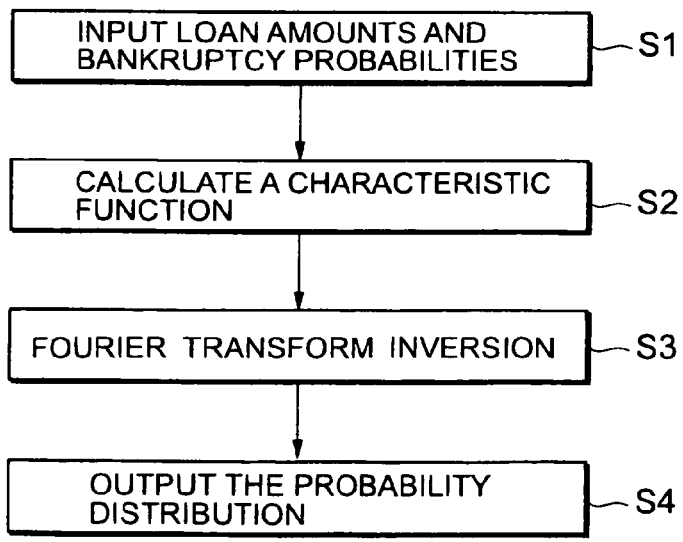
FIG. 2 is a flow chart generally showing a process for obtaining a probability distribution of loan losses according to the first embodiment of the invention.
Figure 3:
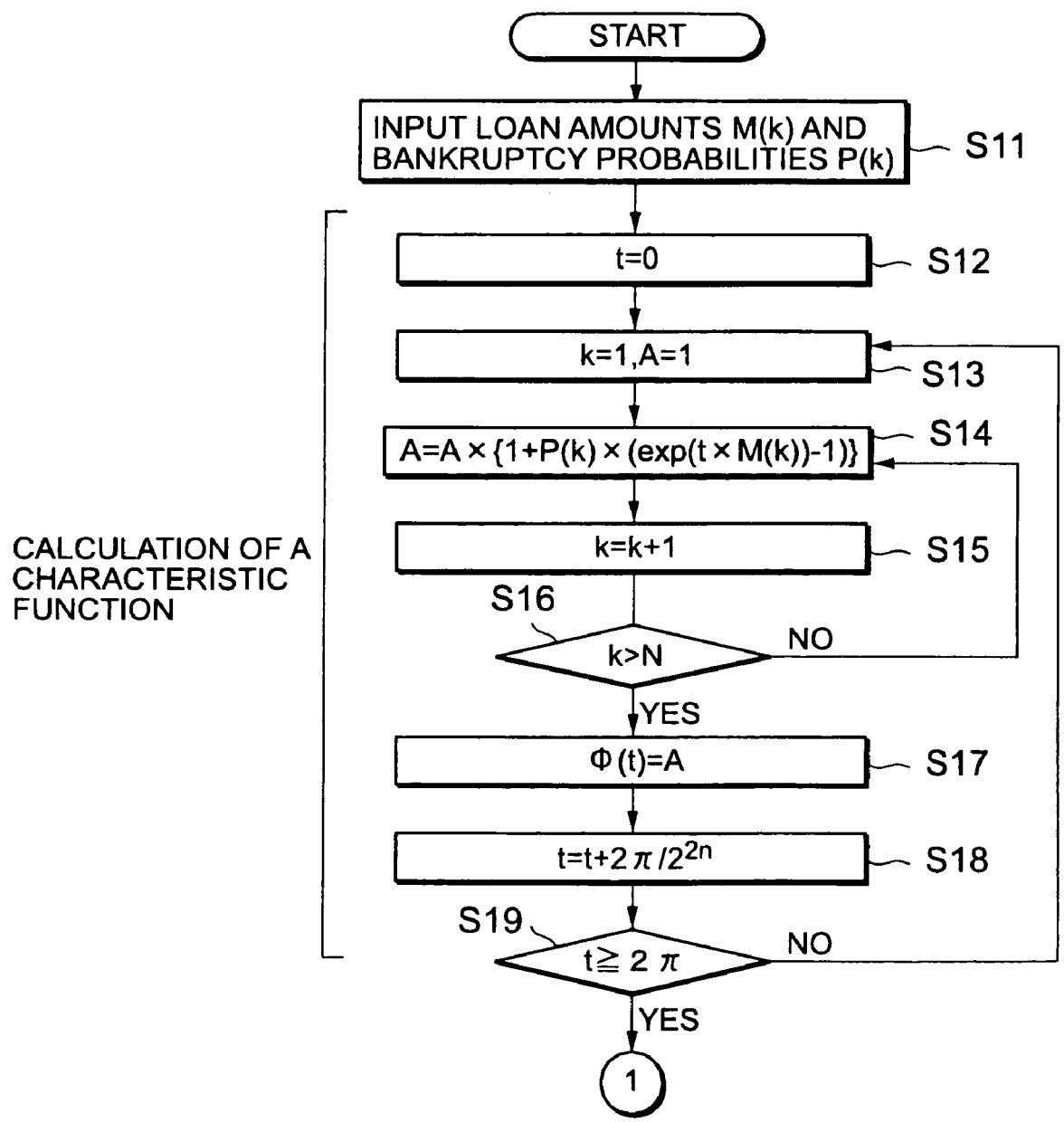
FIG. 3 is a flow chart showing the process for obtaining the probability distribution of loan losses according to the first embodiment in greater detail (1)
Figure 4:
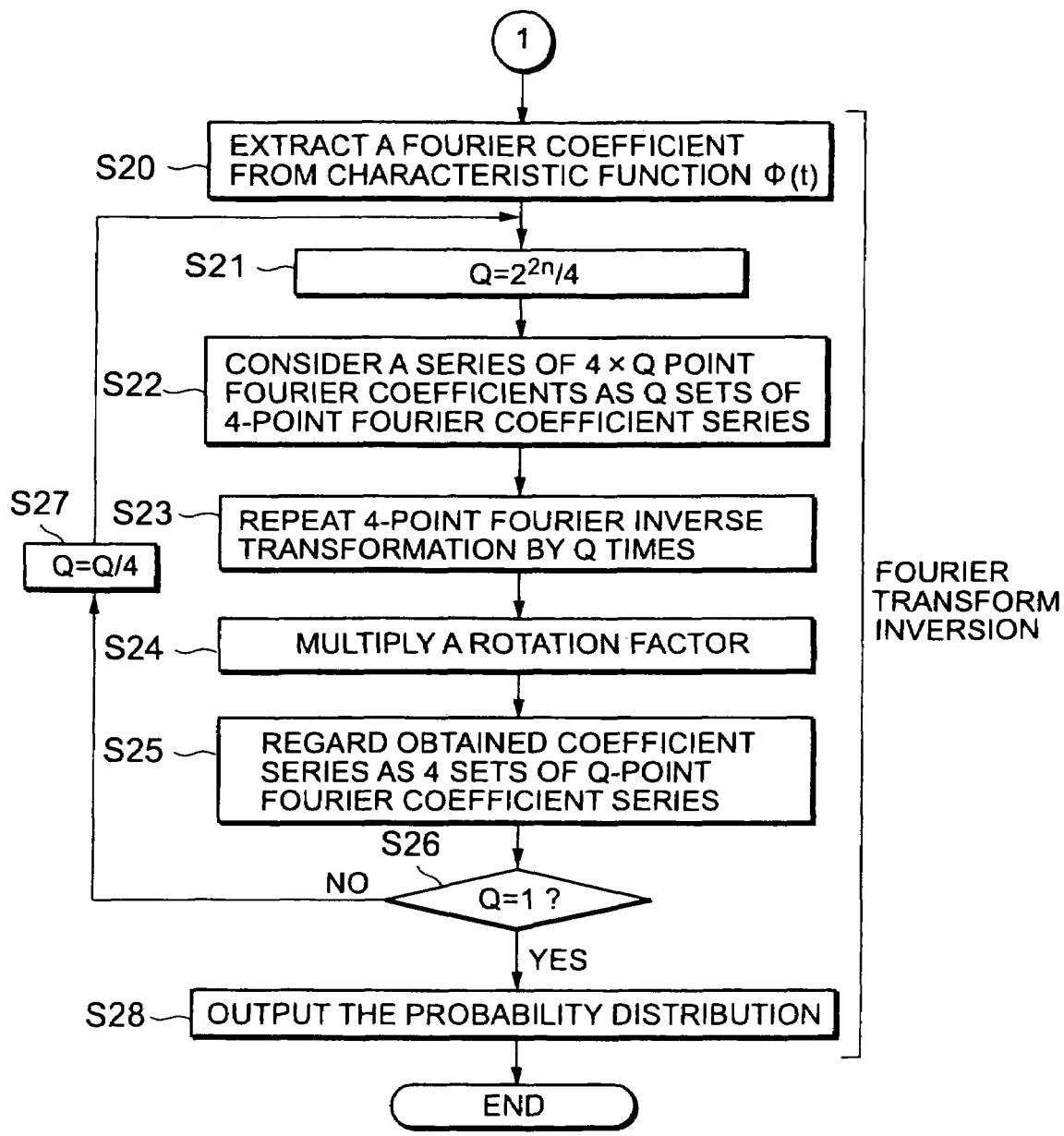
FIG. 4 is a flow chart showing the process for obtaining the probability distribution of loan losses according to the first embodiment in greater detail (2)

Next referring to FIGS. 2 through 4, a process for obtaining the probability distribution f(L) of the loan loss L mentioned above is explained. FIG. 2 is a diagram generally showing the process flow for obtaining the probability distribution f(L) of the loan loss L. FIGS. 3 and 4 are diagrams showing the process flow in greater detail.

First explained with reference to FIG. 2 is an outline of the process executing the technique for computing the probability distribution of a loan loss according to the embodiment through a computer. As shown in FIG. 2, first inputted are the loan amounts $M_k$ to each loan customer and their probabilities $p_k$ of bankruptcy (step S1). Subsequently, after computing the number of loan customers N by using at least one data of these loan amounts $M_k$ and bankruptcy probabilities $p_k$, the characteristic function φ (t) is computed (step S2). Then, by conducting Fourier transform inversion of this characteristic function φ(t), the probability distribution f(L) of the loan loss L in the entire loan amount is obtained (step S3). And, the probability distribution is output through a printer, for example (step S4). This is the outline of the process by this embodiment.

Next made with reference to FIG. 3 is a detailed explanation about the process executing the technique for computing the probability distribution of the loan loss according to the embodiment through a computer. As shown in FIG. 3, the loan amounts $M_k$ to each loan customer and their probabilities $p_k$ of bankruptcy are inputted as data (step S11). k is the variable for identifying the loan customer. That is, M(k) is the loan amount to the loan customer k, and P(k) is the bankruptcy probability of the loan customer k. If these data are downloaded from a large-scale host computer of a bank, for example, they can be inputted more easily. Next, as apparent from Equation (3), while fixing t=0 (step S12), 1 is selected for the variable k for identifying the loan customer, and 1 is selected for the variable A for obtaining the characteristic function φ(t) corresponding to a certain value of t (step S13).

Next conducted an arithmetic operation based on Equation (2) shown above. That is, A=A×{1+P(k)×(exp(t×M(k))−1} is repeated sequentially from k=1 for the number of loan customers N (step S14 through step S16). Subsequently, the computed A is substituted for the characteristic function φ(t). Then, $2\pi/(2^{2n})$ is added to t (step S18). That is, the next t is computed. If this t does not reach 2π (step S19), the process is repeated from step S13. When t reaches or goes beyond 2π (step S19), it means that the characteristic function φ(t) has been obtained, and the process of Fourier transform inversion shown in FIG. 4 is executed.

That is, as shown in FIG. 4, a Fourier coefficient is extracted from the characteristic function φ(t) (step S20). Subsequently, by dividing $2^{2n}$ as the number of points Q by 4, the number of points Q is quartered (step S21). Then, Fourier coefficients of 4×Q points are regarded as Q sets of serial four-point Fourier coefficients (step S22). That is, regarding a series of coefficients C(w), if the remainder of division w by Q is w', C(w'), C(w'+Q), C(w'+2Q) and C(w'+3Q) are regarded as a series of four-point Fourier coefficients. After that, four-point Fourier transform inversion is repeated Q times (step S23). That is, four-point Fourier transform inversion is executed for Q sets. These series of coefficients obtained are expressed as $$D(S, w') \; S=0, 1, 2 \text{ and } 3$$

Figure 5:
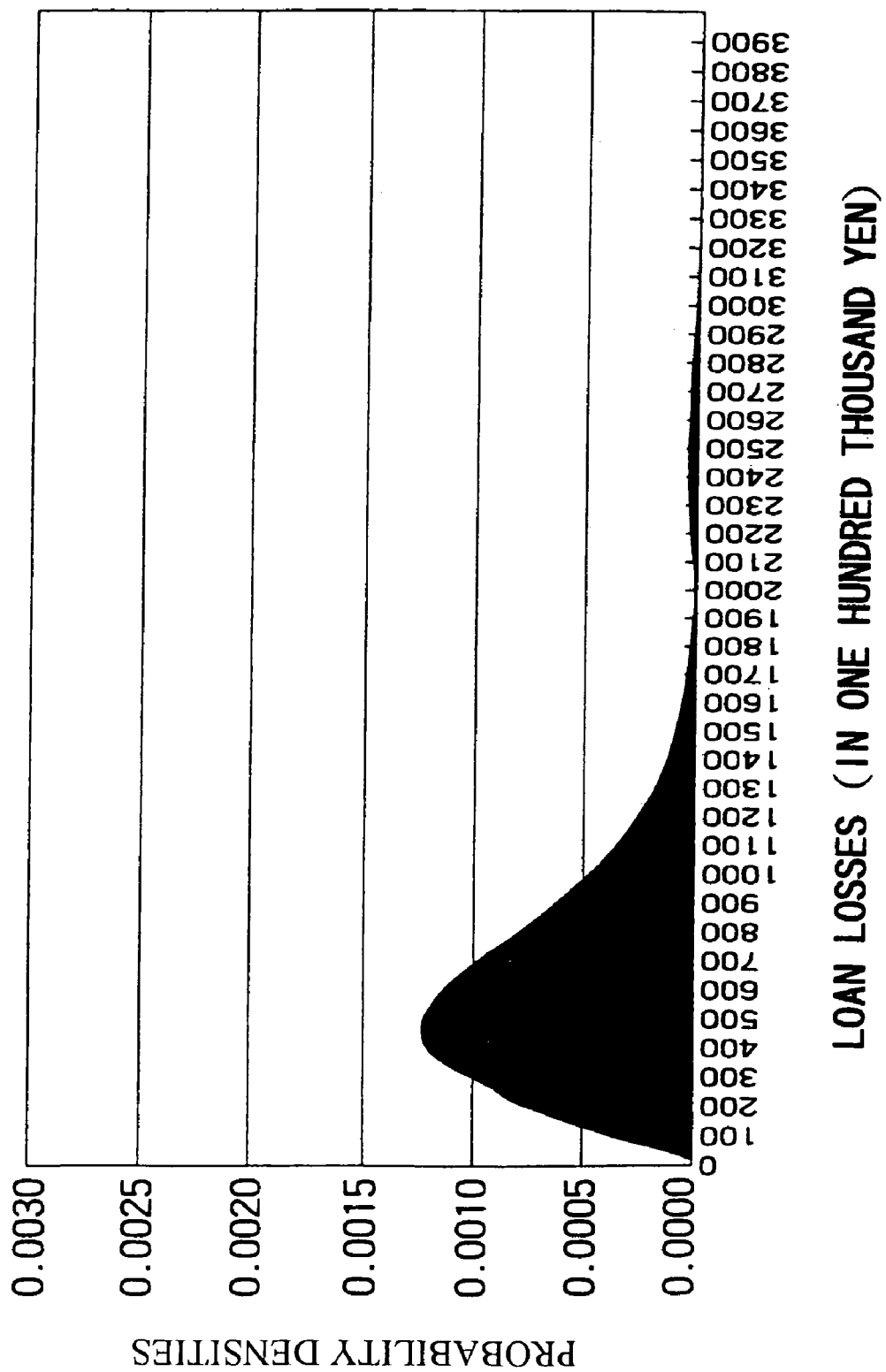
FIG. 5 is a diagram showing a graph of a probability distribution obtained by the invention.

Thereafter, exp((−2πiw'S/(4Q)) which is a rotation factor is multiplied on Q sets of four-point Fourier coefficients series (step S24). Then, Q sets of four-point Fourier coefficients series calculated in this manner are regarded as four sets of Q-point Fourier coefficients series (step S25), and it is judged whether Q=1 is satisfied or not (step S26). If it is judged in step S26 that Q=1 is not satisfied, Q is divided by 4 (step S27), and the process is repeated from step S21. If it is judged in step S26 that Q=1 is satisfied, it means that the Fourier transform inversion of the characteristic function φ(t) has been completed and the probability distribution has been obtained. Therefore, putting the probability density in the probability distribution on the ordinate and putting the loan loss on the abscissa, the probability distribution is outputted (step S28). An example of this output of the probability distribution is shown in FIG. 5. The graph shown in FIG. 5 is made by drawing loan losses on the abscissa in bar graphs in the unit of one yen.

As understood from FIG. 5, this embodiment calculates the probability distribution only up to loan losses beyond which the probability density of loan losses can be regarded substantially zero in the calculation process. That is, the probability density of loan losses above a predetermined amount may be regarded zero either in the calculation process or in the practical use. Therefore, by omitting calculation of the probability distribution of loan losses above a predetermined amount, the embodiment intends to increase the speed of computation. For example, in FIG. 5, the probability density of loan losses above four hundred billion yen can be regarded substantially zero, this embodiment obtains the probability distribution only up to loan losses of four hundred billion yen. In this case, n=20. That is, since a scale for four hundred billion yen in the unit of one yen is required as the abscissa of FIG. 5, n may be selected so that $2^{2n}$−1 exceeds at least four hundred billion. That is, since $2^{2 \times 20}$−1 is about one trillion and nine hundred ninety five billion, n=20 may be set.

It is also possible to calculate probability distribution about all loan losses without omitting those above a predetermined amount unlike this embodiment. That is, calculation process may be done so as to output graphs up to the total amount of loans to all loan customers.

According to the technique of calculating the probability distribution of loan losses according to the embodiment, the probability distribution of loan losses can be computed accurately by using a computer when there are a number of loan customers. Therefore, financing organizations like banks can previously estimate occurrence of loan losses as a probability. For example, taking the example of FIG. 5, it can be expected as a probability that the probability density of the loan loss of 70 billion yen is 0.0010. Also, it can be known that the probability density of loan losses above three hundred billion yen is 99%. By previously knowing occurrence of loan losses as a probability, banks and other financing organization can do risk management on credits by preparing reserve for loan loss or completing their own capitals.

Additionally, since probability distribution of loan losses of and above which the probability density can be regarded substantially zero is omitted from calculation, the load to a computer can reduced, and probability distribution can be computed in a short time.

Second Embodiment

The second embodiment of the invention determines a predetermined amount like one million yen or one hundred million yen as a unit, then rates respective loan amounts of individual loan customers into groups based on the predetermined unit, and calculating probability distributions for respective groups to alleviate the computation load to the computer.

Figure 6:
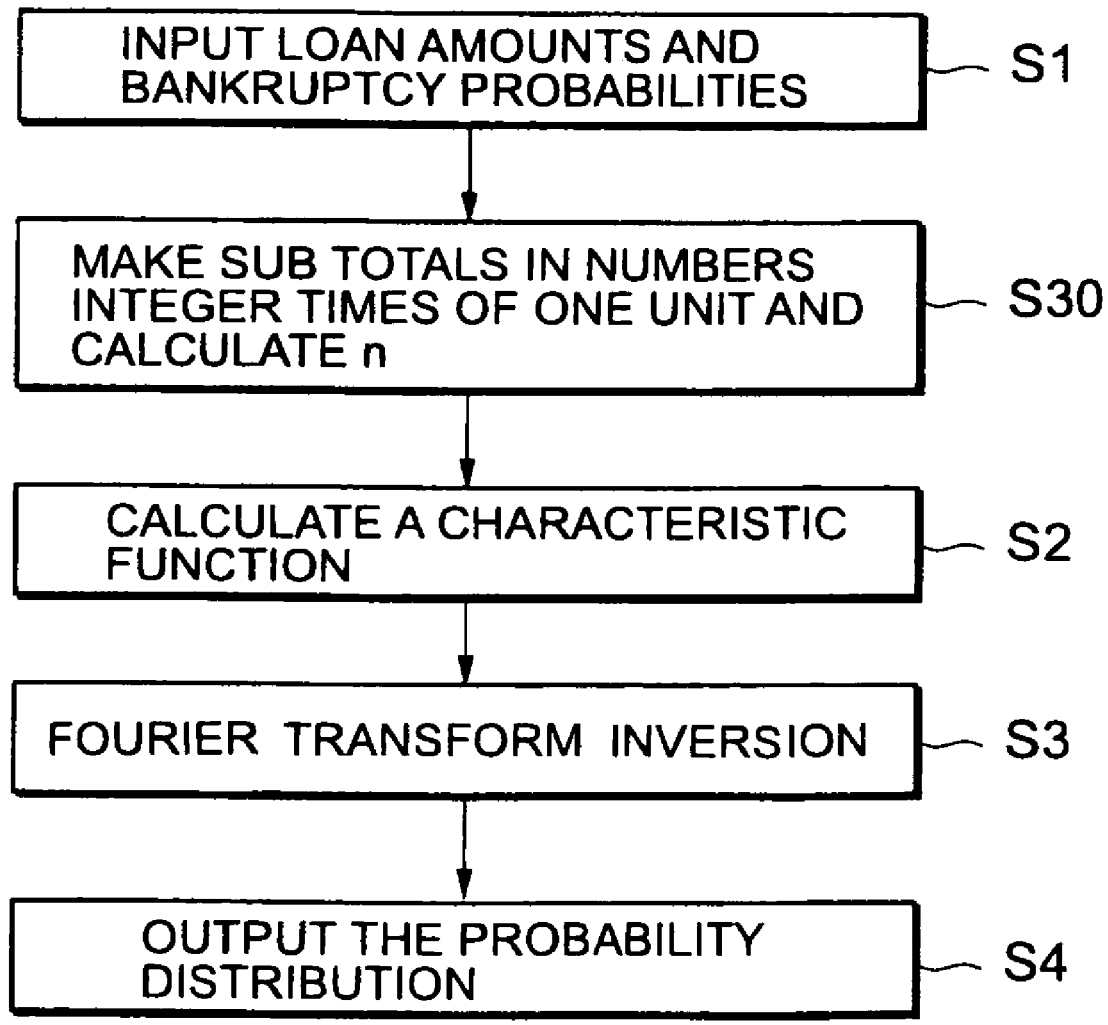
FIG. 6 is a flow chart generally showing a process for obtaining a probability distribution of loan losses according to the second embodiment of the invention.

FIG. 6 is a diagram showing a process of computing probability distribution of loan losses in a financing organization according to the second embodiment in form of a flow. As shown in FIG. 6, the process flow of the second embodiment is different from the process flow of the first embodiment shown in FIG. 2 in that step S30 is interposed between step S1 and step S2. That is, after inputting the loan amounts $M_k$ and the bankruptcy probabilities $p_k$ (step S1) concerning each loan customer, these loan amounts $M_k$ are rounded to the place of the predetermined unit, that is, rounded into integer times of the predetermined unit (step S30). In this rounding process, loan amounts $M_k$ are adjusted by rounding up, rounding down or rounding off to the place of the predetermined unit, i.e., to numbers which are integer times of the predetermined unit. In this embodiment, loan amounts $M_k$ are rounded up to numbers which are integer times of one hundred million yen. After that, the value of n necessary for computation is determined. That is, an amount of loan loss above which the probability of occurrence of loan losses can be regarded substantially zero is divided by the predetermined unit, one hundred million yen, to obtain its quotient. Then, n is determined so that the maximum value of m in Equation (3), namely, $2^{2n}-1$ be equal to or larger than that quotient. Similarly to the first embodiment, assuming that the amount above which the probability of loan losses can be regarded substantially zero is four hundred billion yen, for example, if the predetermined minimum unit is ten million yen, its quotient is 4000. Therefore, the number of points Q for Fourier transform becomes 4000, and since $2^{2 \times 6}-1=4095$, n is determined as 6.

It is also possible to calculate probability distribution about all loan losses instead of limiting it to a certain amount of loan loss, unlike this embodiment. In this case, by dividing the total amount of loans by a predetermined minimum unit, and n may be determined so that $2^{2n}-1$ be equal to or larger than the quotient.

Figure 7:
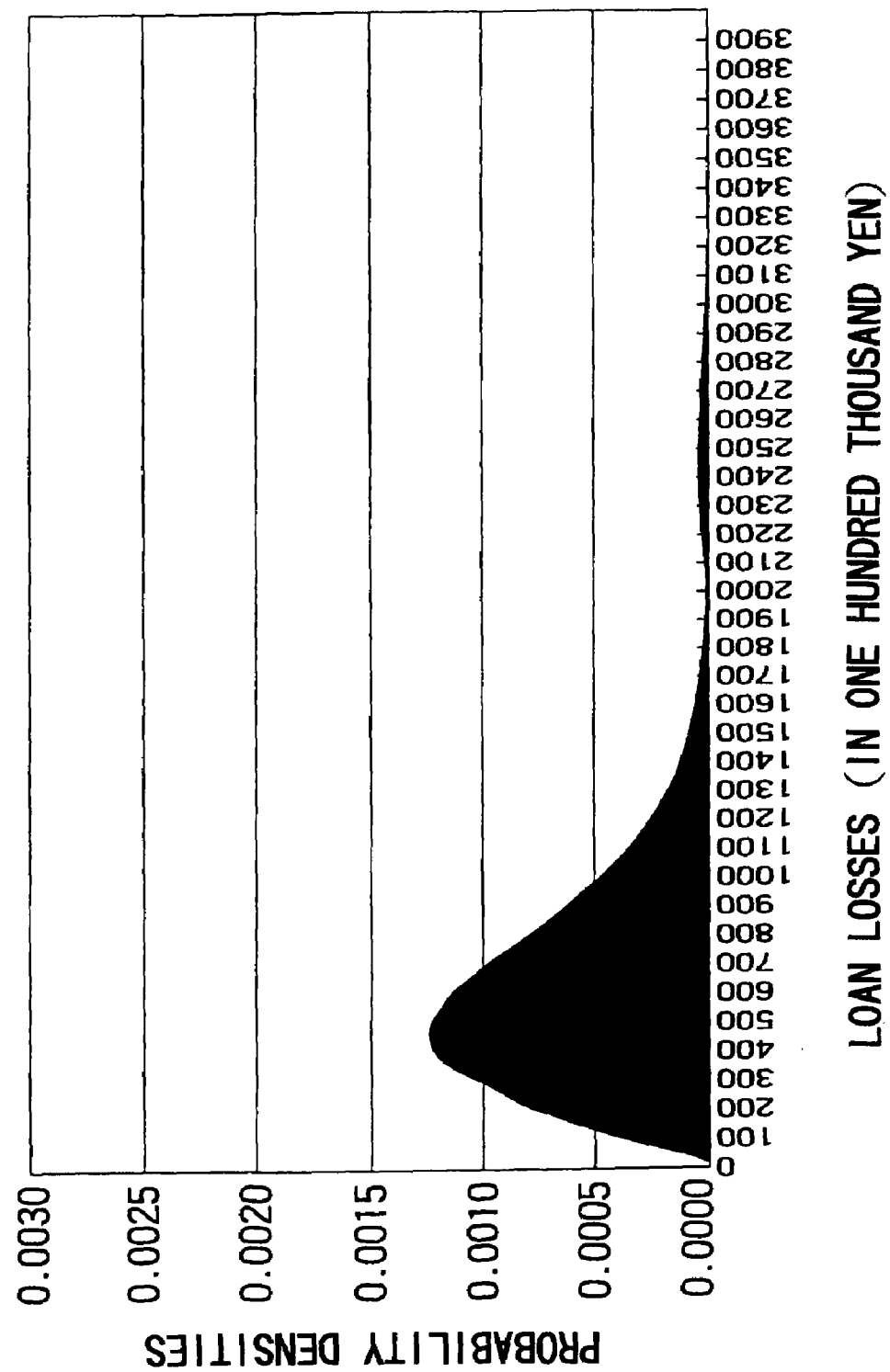
FIG. 7 is a diagram showing a graph of a probability distribution obtained by the invention.

The process after step S30 is the same as that of the first embodiment. In this embodiment, the graph output of the probability distribution of loan losses is bar graphs of every levels corresponding to integer times the predetermined minimum value. An example of the graph output is shown in FIG. 7. As shown in FIG. 7, the graph output shows bar graphs on the abscissa graduated in one hundred yen increments of the loan losses. However, by using a smaller unit amount, an output with substantially no error can be obtained.

According to the technique of calculating the probability distribution of loan losses according to this embodiment, the time required for calculation can be shortened by alleviating the load to the computer. That is, although the first embodiment can calculate probability distribution over the range of loans from 0 to $2^{2n}-1$, it has the problem that it uses one yen as the minimum unit and n becomes unacceptably large in a financing organization having the total amount of loans which reaches or exceeds one trillion. The second embodiment, however, can decrease the value of n by rounding loans of loan customers to numbers which are integer times of a predetermined unit. As a result, this embodiment can alleviate the calculation load to the computer and shorten the calculation time. Therefore, this embodiment can be realized by using an inexpensive personal computer, for example, and the cost for developing a system can be reduced.

Additionally, in this embodiment, when loans to loan customers are rounded up to numbers which are integer times of a predetermined unit, they are rounded up. Therefore, a graph of probability distribution taking the worst estimation into account can be obtained. That is, a graph of probability distribution with a fail-safe concept can be obtained.

Third Embodiment

The third embodiment of the invention is directed to calculation of probability distribution of broadly defined loan losses, considering changes in value of credits caused by changes in the "rating", which shows credible levels of loan customers (debtors), as a kind of loan losses in a broader sense. That is, although the first and second embodiments take only two states, i.e. whether loan customers go or do not go into bankruptcy, to consider that loan losses occur only upon bankruptcy, the embodiment shown here considers that loan losses will occur when the rating of loan customers changes even when they do not go into bankruptcy.

Figure 8:
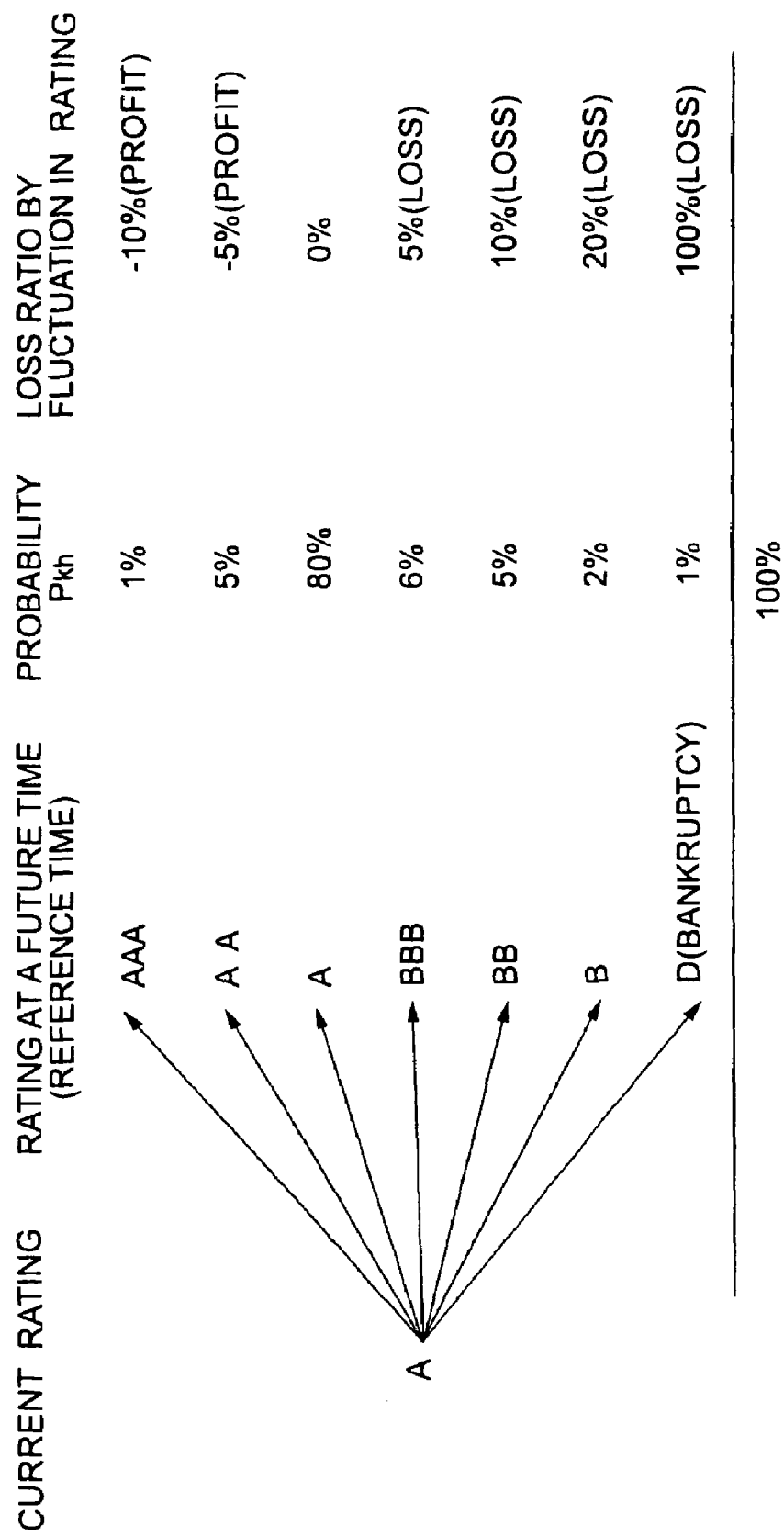
FIG. 8 is a diagram for explaining patterns of possible changes in rating of a certain customer from the current time up to a certain future time.

With reference to FIG. 8, explanation is made about the "rating". In the example of FIG. 8, there are seven grades of rating of loan customers, "AAA", "AA", "A", "BBB", "BB", "B" and "D". "AAA" is the highest grade, and indicates that a loan customer graded so is a blue-chip enterprise. The rating sequentially degrades to "AA", "A", "BBB", "BB", and "B", and "D" indicates that a loan customer so graded went into bankruptcy.

A change in value of credits caused by a change in "rating" means that, if all credits are re-evaluated at a reference point of time in a future, credits to loan customers changed to higher ranks will be evaluated higher and credits to loan customers changed to lower ranks will be evaluated lower. This embodiment considers changes in value of credits to be involved in loan losses in a broad sense, and intends to comprehend in form of probability distribution how the value of credits is expected to change at a future point of time.

In the example of FIG. 8, a specific loan customer is currently ranked "A". The probability $P_{kh}$ that this loan customer k is ranked "AAA" at a future point of time is 1%, the probability $P_{kh}$ of being ranked "AA" is 5%, the probability $P_{kh}$ of being ranked "A" is 80%, the probability $P_{kh}$ of being ranked "BBB" is 6%, the probability $P_{kh}$ of being ranked "BB" is 5%, the probability $P_{kh}$ of being ranked "B" is 2%, and the probability $P_{kh}$ of being ranked "D" is 1%. Note here that, also when the loan customer k remains ranked "A" at the future point of time, it is expressed in probability $P_{kh}$, assuming for convenience that it changes from the current grade "A" to the grade "A".

Here is expected that, if the loan customer is ranked "AAA" at the future point of time, the ratio of the loss of the credit value caused by the change of the rating will be −10% of the loan amount. That is, it is expected that a profit of 10% of the loan amount will be generated. If the loan customer is ranked "AA" at the future point of time, the loss ratio of the credit value is expected to be −5% of the loan amount. That is, a profit of 5% of the loan amount is expected. If the loan customer is ranked "A" at the future point of time, there is no change in the rating, and the credit value is expected to remain unchanged.

If the loan customer k is ranked "BBB" at the future point of time, the loss ratio of the credit value caused by the change in the rating is expected to be 5% of the loan amount. That is, a loss of 5% of the loan amount is expected. If the loan customer k is ranked "BB" at the future point of time, the loss ratio of the credit value caused by the change in the rating is expected to be 10% of the loan amount. That is, a loss of 10% of the loan amount is expected. If the loan customer is ranked "B" at the future point of time, the loss ratio of the credit value caused by the change in the rating is expected to be 20% of the loan amount. That is, a loss of 20% of the loan amount is expected. If the loan customer k is ranked "D" at the future point of time, it means bankruptcy of the loan customer, and the loss of all loan amount is expected.

Next, the characteristic function $\phi(t)$ taking such a possible change in rating into account is derived.

Assume that there are N loan customers k=1, 2, . . . N, and H grades of rating. Let $p_{kh}$ be the probability that the rating of the loan customer k changes to an h-order grade. Since the loan customer k has one of grades of rating, $$\sum_{k=1}^{H} P_{kh} = 1 \quad (4)$$

Let $M_{kh}$ be the changed amount of the credit value as a result of a change of the rating of the loan customer k to the h-order grade at a certain point of time in the future. In the example of FIG. 8, by multiplying the loss ratio by the change in rating by the loan amount, the changed amount $M_{kh}$ of the credit value can be obtained. Under these conditions, the characteristic function $\phi(t)$ of the changed amount of the credit value is $$\phi(t) = \prod_{k=1}^{N} \left\{ \sum_{k=1}^{H} p_{kq} \exp(itM_{kh}) \right\} \quad (5)$$

That is, by merely modifying Equation (2) to Equation (5), the characteristic function of the changed amount of the credit value, i.e. the characteristic function $\phi(t)$ of the loan losses in a broad sense can be expressed.

By processing the characteristic function $\phi(t)$ by Fourier transform inversion, probability distribution of loan losses in a broader sense can be obtained.

Figure 9:
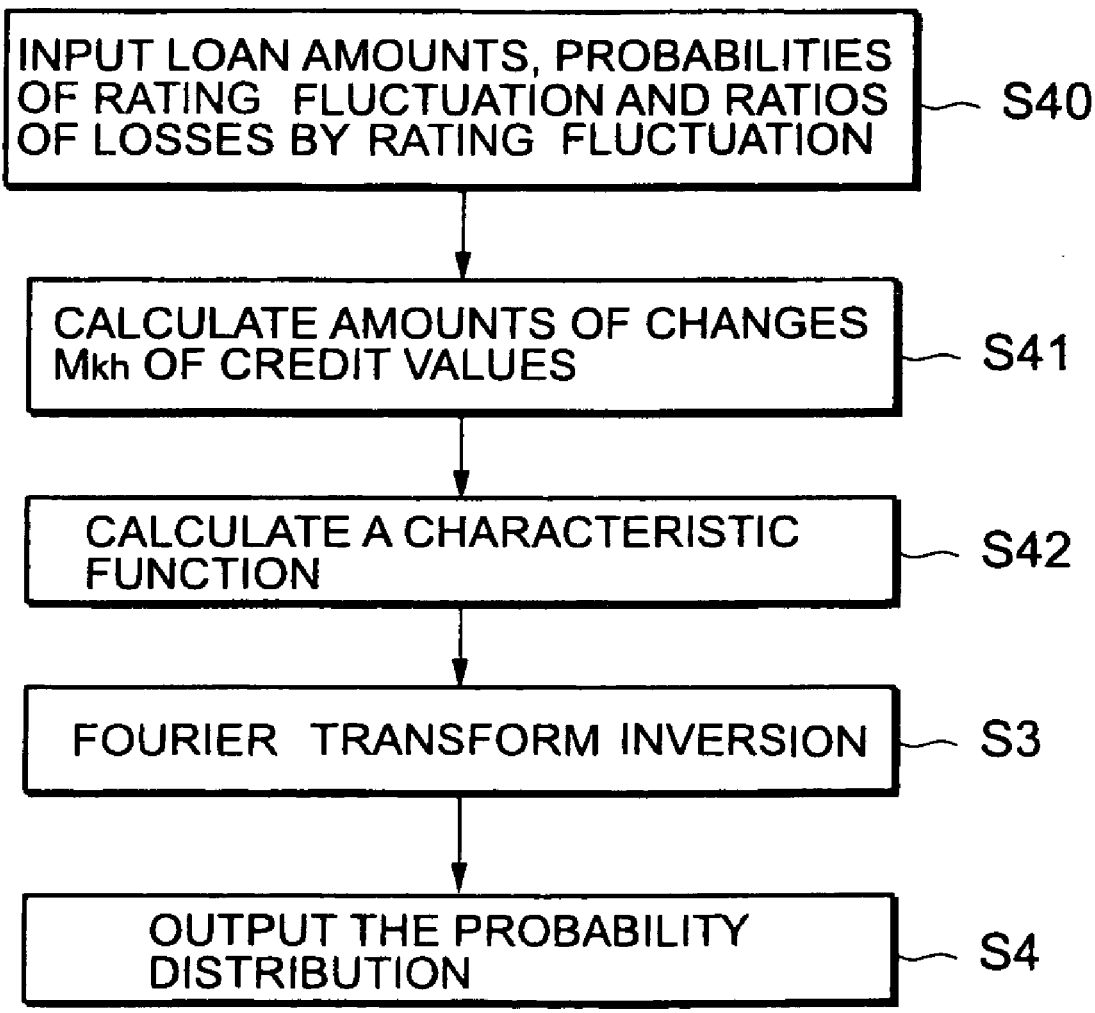
FIG. 9 is a flow chart generally showing a process for obtaining a probability distribution of loan losses according to the third embodiment of the invention.

Next referring to FIG. 9, explanation is made about a technique for calculating probability distribution of the broad-sense loan losses according to this embodiment through a computer. FIG. 9 is a flow chart for explaining the process therefor. As shown in FIG. 9, loan amounts $M_k$, probabilities $p_{kh}$ of a change in rating and loss ratios caused by the change in rating are inputted first (step S40). The probabilities $p_{kh}$ of a change in rating and the loss ratios caused by the change in rating may be inputted for every loan customer or they may collectively determined for all possible changes in rating independently from specific loan customers.

Next, after computing the number of loan customers N by using the data of loans $M_k$, the changed amount in credit value for each loan customer is calculated from the loan $M_k$ of each loan customer and the loss ratio caused by a change in rating (step S41).

After that, using the probability $P_{kh}$ of the change in rating of each loan customer and the changed amount $M_{kh}$ of the credit value of each loan customer, the characteristic function $\phi(t)$ shown in Equation (5) is computed (step S42). After that, by Fourier transform inversion of the characteristic function $\phi(t)$, the probability distribution f(L) of the broad-sense loan losses is obtained (step S3). Then, this probability distribution is output through a printer, for example (step S4).

As explained above, the computing technique concerning probability distribution of broad-sense loan losses according to the invention enables risk management of credits taking account of the risk that each credit value may decrease due to a change in credit the loan customer toward the worse even when it does not go into bankruptcy. That is, as shown in FIG. 8, even if a loan customer does not fall into bankruptcy (grade "D") at a future point of time, if its rating falls to the grade "BBB", "BB" or "B", the value of the credit thereto decreases. This decrease in value of the credit can be regarded to be a loan loss in a broad sense. The third embodiment can obtain probability distribution of broad-sense loan losses, taking such decrease of the credit value into consideration.

Fourth Embodiment

The fourth embodiment of the invention is directed to precisely obtaining probability distribution of loan losses by preparing a plurality of scenarios about actual losses and probability of loan losses and averaging these scenarios.

The actual loss herein means the amount obtained by subtracting a secured amount, etc. from a loan to a loan customer. That is, it can be expressed by actual loss=(loan to the loan customer)−(secured amount). This is because, even when a loan customer goes into bankruptcy, if a guarantee or collateral is held for the loan, a part or all of the loan as much as the value of the collateral can be recovered, and an amount corresponding to the difference is the actual loss.

First explained is a general formula. Assume that there are N loan customers k=1, 2, ... N, their bankruptcy probability is $p_k$, and probability that the loan amount is $M_k$ is $G(p_1, p_N, M_1, \ldots M_N)$. And assume that probability distribution of loan losses obtained by Fourier transform inversion is $f(L, p_1, \ldots, p_N, M_1, \ldots, M_N)$ in the case where the bankruptcy probability of each loan customer is $p_1, \ldots, p_N'$ and the loan amount is $M_1, \ldots, M_N$. In such cases where the bankruptcy probability and loan amounts vary with a certain probability, probability distribution of loan losses becomes $$\Sigma f(L, p_1, \ldots, p_N, M_1, \ldots, M_N) G(p_1, \ldots, p_N, M_1, \ldots, M_N) \quad (6)$$

(where sums are calculated on all combinations of $p_1, \ldots, p_N'$, $M_1, \ldots, M_N$)

Alternatively, in the case where probability distribution of bankruptcy probability and changes in loan amounts is continuous, it is assumed that there are N loan customers k=1, 2, ... N, their bankruptcy probability is $p_k$, and the probability density is $g(p_1, \ldots, p_N, M_1, \ldots, M_N)$. In this case, probability distribution becomes $$3f(L, p_1, \ldots, p_N, M_1, \ldots, M_N) g(p_1, \ldots, p_N, M_1, \ldots, M_N) dp_1 \ldots dp_N dM_1 \ldots dM_N \quad (7)$$

That is, by numerical integration, probability distribution of loan losses is obtained.

Figure 10:
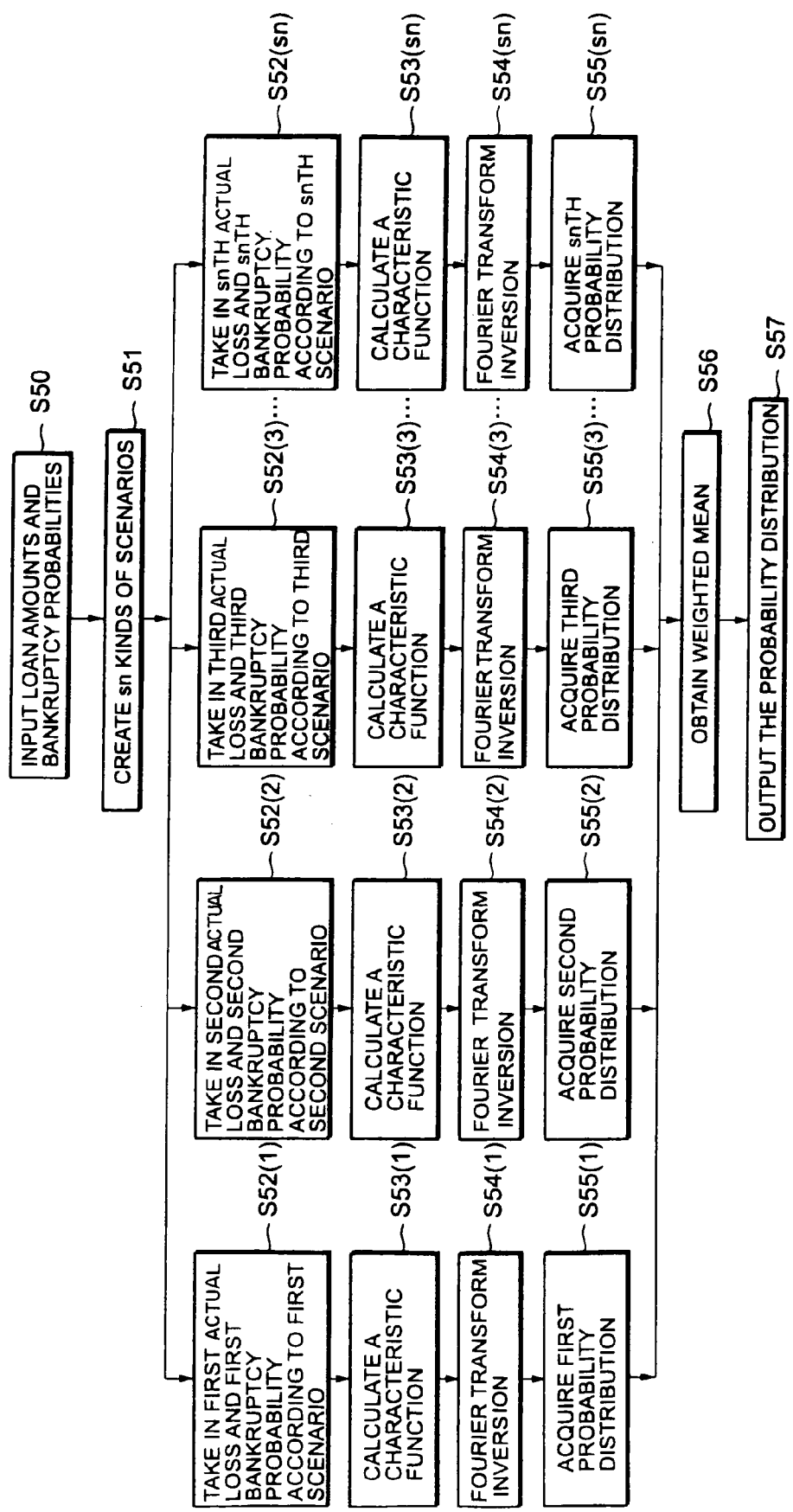
FIG. 10 is a flow chart generally showing a process for obtaining a probability distribution of loan losses according to the fourth embodiment of the invention.

Next referring to FIG. 10, explanation is made about a process executing the technique for calculating probability distribution of loan losses according to this embodiment by means of a computer. As shown in FIG. 10, loan amounts $M_k$ to individual loan customers and their bankruptcy probabilities $p_k$ (step S1) are inputted (step S50). Next, after computing the number of loan customers N by using at least one of the data of loans $M_k$, sn scenarios are generated, and the actual loss of each loan customer and its bankruptcy probability are generated for each scenario. That is, about each of the first to sn-th scenarios, the actual loss of each loan customer and its bankruptcy probability are generated.

For example, if the value of the collateral changes in the future, it results in a change of the actual loss. The bankruptcy probability may also change with possible economical fluctuation in the future. As to actual losses and bankruptcy probabilities for these sn scenarios, operator's expected values maybe inputted, or they may be calculated by computer simulation or by using a function.

After that, probability distribution of loan losses is calculated for each scenario. That is, the first actual losses and the first bankruptcy probabilities of individual loan customers according to the first scenario are taken in (step S52(1)), and the characteristic function is computed based on these first actual losses and first bankruptcy probabilities (step S53(1)). Subsequently, the characteristic function are processed by Fourier transform inversion (step S54(1)) to obtain the first probability distribution (step S55(1)).

Similarly, the second probability distribution according to the second scenario is acquired (step S52(2) through step S55(2)), the third probability distribution according to the third scenario is acquired (step S52(3) through step S55(3)), et. seq., and the sn-th probability distribution according to the sn-th scenario is acquired (step S52(sn) through step S55(sn)).

Through these steps, sn probability distributions are obtained. In this embodiment, based on Equation (6) shown above, a weighted mean of these sn probability distributions is obtained (step S56), and the probability distribution as the weighted mean is output through a printer, for example (step S47). Although the example of FIG. 10 obtains the probability distribution of loan losses averaging all scenarios, it is also possible to individually output sn probability distributions of loan losses through a printer, for example, so that an operator can analyze the outputted results. Additionally, if Equation (7) shown above is used, average of the scenarios is obtained by numerical integration in step S56.

Next explained is a technique for generating a plurality of scenarios based on a function in step S51. In this embodiment, a plurality of bankruptcy probabilities of respective loan customers are generated on the basis of a function. Therefore, regarding the loan amounts, they may be fixed for respective loan customers, or data predicted by an operator for respective scenarios may be input.

(Multi-Factor Model)

First explained is a multi-factor model. Let Norm( ) be a cumulative distribution function of standard normal distribution. Assume that there are R random variables $u_1, u_2, \ldots u_R$, they are in accordance with an R-dimensional normal distribution, and its probability density function is $f_R( )$. Also assume that the number of loan customers is N, that there are random variables $y_k$ which indicate conditions of respective loan customers k=1, ..., N, and that the random variables can be expressed by $$y_k = \sum_{r=1}^{R} a_{kr} u_r + \varepsilon_k \quad (8)$$

where $a_{kr}$ are constants, $e_k$ are random variables independent from the random variables $u_1, u_2, \ldots u_R$ in accordance with the standard normal distribution, and respective $e_k$ are independent from each other. Further assume that there are constants $Y_k$, and when $y_k < Y_k$, a loan customer goes into bankruptcy.

In this case, the possibility that the loan customer k goes into bankruptcy, that is, $$y_k < Y_k$$

$$\varepsilon_k < Y_k - \sum_{r=1}^{R} a_{kr} u_r$$

are equal in meaning, and bankruptcy and non-bankruptcy of the loan customer k is determined only by the random variable $e_k$ under the condition where the random variables $u_1, u_2, \ldots u_R$ are fixed.

Since random variables E k are independent from each other, bankruptcy and non-bankruptcy of the loan customer k are independent from each other under the condition where the random variables $u_1, u_2, \ldots u_R$ are fixed. In this case, the bankruptcy probability of the loan customer k is specified as $$\text{Norm}\left(Y_k - \sum_{r=1}^{R} a_{kr} u_r\right) \quad (9)$$

That is, from Equation (9), probability distribution of R-dimensional bankruptcy probabilities can be obtained. From the R-dimensional function expressed by Equation (9), a necessary number of bankruptcy probabilities are sampled. That is, sn scenarios are acquired from the R-dimensional function expressed by Equation (9), and bankruptcy probabilities of individual loan customers are acquired for each of the scenarios. More specifically, dmn values are sampled about each factor $u_r$ of Equation (9), and by repeating it for R dimensions, $(dmn)^R$=sn scenarios are acquired. Then, for each scenario, bankruptcy probabilities of individual loan customers are acquired from Equation (9).

In this example of this embodiment, sn is 25. The random variable $u_r$ is a factor indicating the general economical condition, and the smaller the value, the worse the economical condition. R pieces are prepared as the factor indicating the economical condition to predict various economical conditions. $a_{kr}$ is a coefficient indicating in the r dimension how the business of the loan customer k is liable to suffer influences from economical fluctuations, and the larger the value, the more liable to suffer influences from the general economical condition the loan customer k.

If the probability distribution of loan losses is F (L, $u_1$, $u_2$, ... $u_R$), the averaged probability distribution of loan losses is $$3F(L, u_1, \ldots, u_R)f_R(u_1, \ldots, u_R)du_1 \ldots du_R \qquad (10)$$

By numerically integrating it, the probability distribution of loan losses can be obtained.

(One-Factor Model)

As a special case of the multi-factor model, there is a one-factor model. Next made below is explanation on the one-factor model.

Let Norm( ) be a cumulative distribution function of standard normal distributions. Assume that a random variable u exists, and it is accordance with a standard normal distribution. Also assume that the number of loan customers is N, there are random variables $y_k$ which indicate conditions of respective loan customers k=1, ... , N, and the random variables can be expressed by $$y_k = a_k u + e_k \qquad (11)$$

where $a_k$ is a constant, $e_k$ is random variable independent from the random variable u in accordance with the standard normal distribution, and respective $e_k$ are independent from each other. Further assume that there is a constant $Y_k$, and when $y_k < Y_k$, a loan customer goes into bankruptcy.

In this case, the possibility that the loan customer k goes into bankruptcy, that is, $$y_k < Y_k$$

$$e_k < Y_k - a_k u$$

are equal in meaning, and bankruptcy and non-bankruptcy of the loan customer k is determined only by the random variable $e_k$ under the condition where the random variable u is fixed.

Since random variables $e_k$ are independent from each other, bankruptcy and non-bankruptcy of the loan customer k are independent from each other under the condition where the random variable u is fixed. In this case, the bankruptcy probability of the loan customer k is specified as $$\text{Norm}(Y_k - a_k u) \qquad (12)$$

That is, from the function expressed by Equation (12), sn probabilities of bankruptcy are sampled. That is, sn scenarios are acquired from the function expressed by Equation (12), and bankruptcy probabilities of individual loan customers are acquired for each of the scenarios.

In this embodiment, sn is 25. The random variable u is a factor indicating the general economical condition, and the smaller the value, the worse the economical condition. $a_k$ is a coefficient indicating how the business of the loan customer k is liable to suffer influences from economical fluctuations, and the larger the value, the more liable to suffer influences from the general economical condition the loan customer k.

If the random distribution of loan losses is F (L, u), the averaged probability distribution of loan losses is $$3F(L, u)\text{Norm}'(u)du \qquad (13)$$

By numerically integrating it, the averaged probability distribution of loan losses can be obtained.

As explained above, the technique for computing probability distribution of loan losses according to the embodiment can obtain more precise probability distribution of loan losses by preparing a plurality of scenarios different in actual loss and bankruptcy probability, then calculating a plurality of probability distributions based on these scenarios and obtaining their average. That is, it is possible to obtain probability distribution of loan losses taking account of possible future general economical aspects and fluctuations in value of the collateral.

Since this technique can calculate probability distribution of loan losses upon fluctuations in bankruptcy probabilities and fluctuations in loan amounts, it is useful for risk management of credits in a financing organization.

The invention is not limited to the above-explained embodiments, but can be modified and changed in various modes. For example, probability density of loan losses can be output in form of a numerical list instead of a bar graph. Further, although the foregoing embodiments have been explained as using fast Fourier transform for executing Fourier transform inversion, other techniques, such as the use of typical Fourier transform inversion formulas, are also acceptable. That is, by selecting Q as the number of points, Fourier transform inversion can be executed by using the Fourier inverse transform formula shown as Equation (14).

$$f(L) = \frac{1}{Q}\sum_{m=0}^{Q-1} \phi\left(\frac{2\pi m}{Q}\right)\exp\left(-i\frac{2\pi m}{Q}L\right) \qquad (14)$$

In the first to third embodiments, taking account of the value of a collateral or guarantee held for a loan as explained in the fourth embodiment, probability distribution of loan losses may be computed by using the actual loss which a financing organization will actually lose when the loan customer goes into bankruptcy.

Furthermore, it is also possible to record the processes according to the above-explained embodiments on a recording medium such as floppy disk or CD-ROM. In this case, by retrieving the data from the storage of the recording medium onto a general-purpose computer, the technique according to the invention can be realized.

Figure 11:
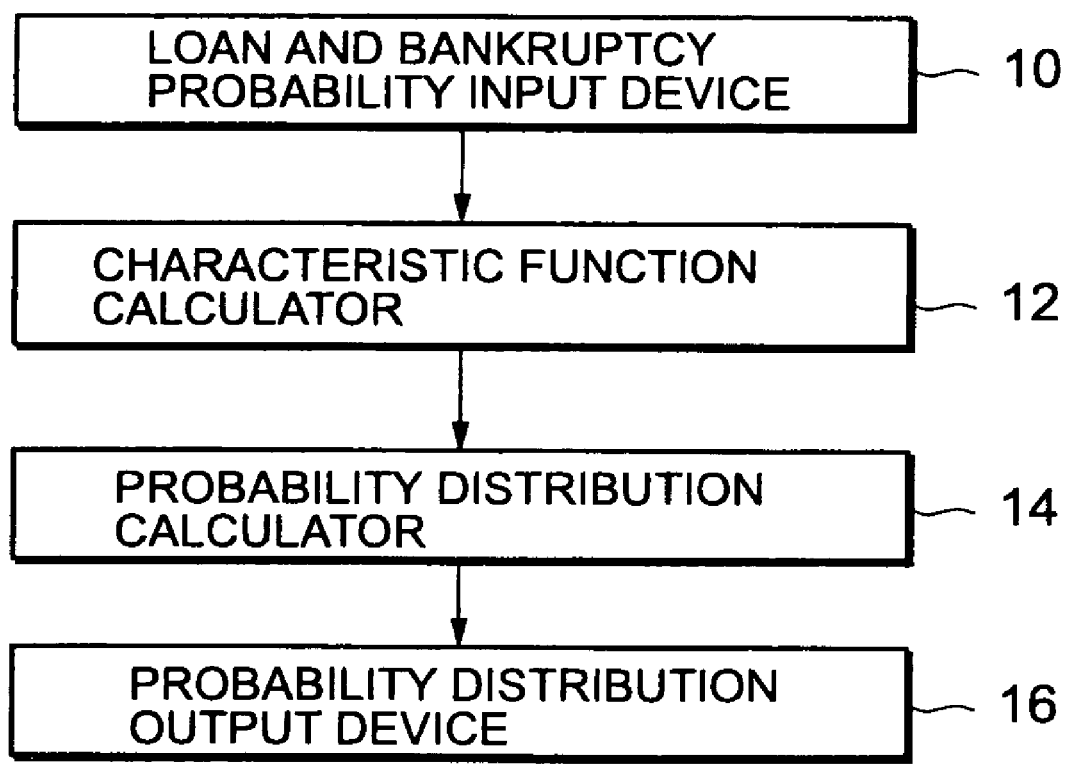
FIG. 11 is a system for computing a probability distribution of loan losses, which realizes the invention by hardware.
Figure 12:
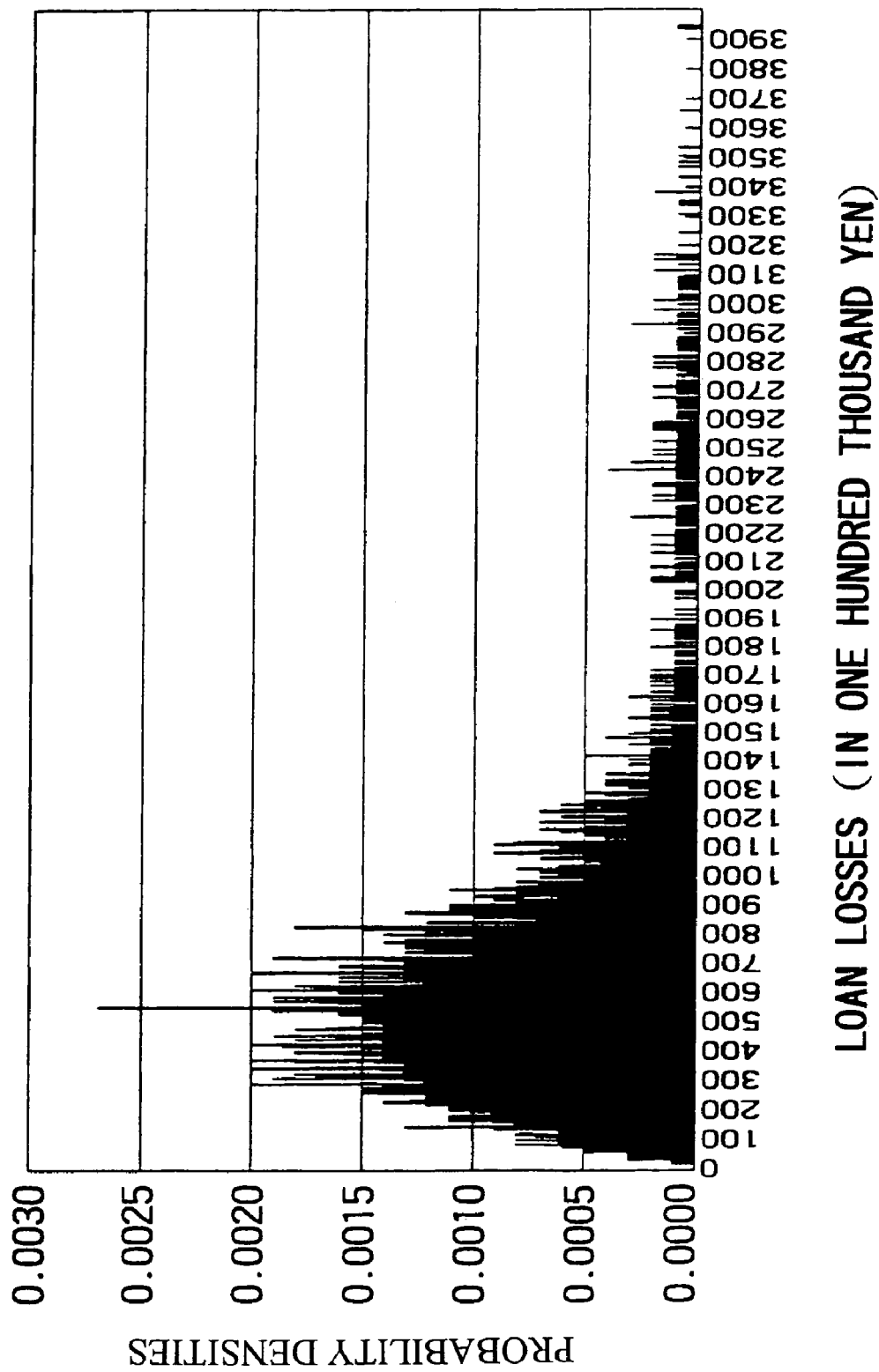
FIG. 12 is a diagram showing a graph of a probability distribution obtained a conventional simulation method.

It is also possible to realize those embodiments in a hardware mode. Configuration of an exemplary system for computing probability distribution of loan losses realizing the first embodiment, for example, in a hardware mode is shown in FIG. 11. As shown in FIG. 11, the system for computing probability distribution of loan losses includes a loan amount and bankruptcy probability input device 10 through which loan amounts and bankruptcy probabilities of individual loan customers are inputted, a characteristic function computing device 12 for computing a characteristic function on the basis of these loan amounts and bankruptcy probabilities, a probability distribution computing device 14 for computing probability distribution by Fourier transform inversion of the characteristic function, and a probability distribution output device 16 for outputting the calculated probability distribution as a graph to a printer.

According to the present invention, a financing organization having a plurality of loan customers can precisely compute probability distribution of loan losses through a computer and stochastically estimate occurrence of loan losses in advance.

What is claimed is:

1. A computer based system for computing probability distribution of loan losses in a financing organization having a plurality of loan customers, comprising:
    a scenario acquiring means for acquiring loan amounts of each loan customer and acquiring a plurality of bankruptcy probabilities of each said loan customer by predicting future fluctuations, and then using these values as a plurality of scenarios;
    a characteristic function calculating means for calculating characteristic functions for each said scenario on the basis of said loan amounts and said bankruptcy probabilities acquired by said scenario acquiring means;
    a probability distribution calculating means for calculating probability distributions for each said scenario by Fourier transform inversion of said characteristic functions calculated by said characteristic function calculating means;
    an average probability distribution calculating means for calculating an average probability distribution which is the average of said probability distributions for each said scenario; and
    a probability distribution output means for outputting said average probability distribution calculated by said average probability distribution calculating means,
    wherein said scenario acquiring means expresses probabilities of bankruptcy of said loan customers by a function, and acquires said plurality of bankruptcy probabilities according to said function,
    wherein said function expressing probabilities of said loan customers is $$Norm\left[Y_k - \sum_{r=1}^{R} a_{kr} u_r\right]$$

where k indicates each loan customer, $u_r$ are random variables according to an R-dimensional normal distribution, and $a_{kr}$ are constants,
    wherein Norm( ) is a cumulative distribution function of a standard normal distribution and $Y_k$ is a constant.

2. A computer based system for computing probability distribution of loan losses in a financing organization having a plurality of loan customers, comprising:
    a scenario acquiring means for acquiring loan amounts of each loan customer and acquiring a plurality of bankruptcy probabilities of each said loan customer by predicting future fluctuations, and then using these values as a plurality of scenarios;
    a characteristic function calculating means for calculating characteristic functions for each said scenario on the basis of said loan amounts and said bankruptcy probabilities acquired by said scenario acquiring means;
    a probability distribution calculating means for calculating probability distributions for each said scenario by Fourier transform inversion of said characteristic functions calculated by said characteristic function calculating means;
    an average probability distribution calculating means for calculating an average probability distribution which is the average of said probability distributions for each said scenario; and
    a probability distribution output means for outputting said average probability distribution calculated by said average probability distribution calculating means,
    wherein said scenario acquiring means expresses probabilities of bankruptcy of said loan customers by a function, and acquires said plurality of bankruptcy probabilities according to said function,
    wherein said function expressing probabilities of said loan customers is $$Norm(Y_k - a_k u)$$

where k indicates each loan customer, u is a random variable, and $a_k$ is a constant,
    wherein Norm( ) is a cumulative distribution function of a standard normal distribution and $Y_k$ is a constant.

3. A computer based system for computing probability distribution of loan losses in a financing organization having N loan customers k=1 . . . N comprising:
    an input means for inputting loan amounts $M_k$ to each said N loan customers k=1 . . . N and bankruptcy probabilities $p_k$ thereof;
    a loan customer calculating means for calculating the number N of said loan customers on the basis of said loan amounts $M_k$ and/or said bankruptcy probabilities $p_k$ inputted by said input means;
    a characteristic function calculating means for calculating a characteristic function $$\phi(t) = \prod_{k=1}^{N} \{1 + p_k(\exp(itM_k) - 1)\}$$

at each t of $t=2\pi m/(2^{2n})$ (m=0, 1, 2, . . . , $2^{2n}-1$) for the number of points n of Fourier transform;
    a probability distribution calculating means for calculating a probability distribution by Fourier transform inversion of said characteristic function calculated by said characteristic function calculating means, by using a fast Fourier transform technique; and
    a probability distribution output means for outputting said probability distribution calculated by said probability distribution calculating means.

4. The system for computing probability distribution according to claim 3 wherein $2^{2n}-1$ which is the greatest value of m in said characteristic function calculating means is a value not less than the sum of all loan amounts.

5. The system for computing probability distribution according to claim 3 wherein $2^{2n}-1$ which is the greatest value of m in said characteristic function calculating means is a value not less than the minimum of values for which probability of loan losses can be regarded substantially zero in the calculation process.

6. The system for computing probability distribution according to claim 3 further comprising a loan amount rounding means for rounding each said loan amount inputted through said input means to a number integer times of a predetermined unit, and
$2^{2n}-1$ which is the greatest value of m in said characteristic function calculating means being a value not less than the quotient obtained by dividing the sum or all loan amounts by said predetermined unit.

7. The system for computing probability distribution according to claim 3 further comprising a loan amount rounding means for rounding each said loan amount inputted through said input unit to a number integer times of a predetermined unit, and
$2^{2n}-1$ which is the greatest value of m in said characteristic function calculating means being a value not less than the quotient obtained by dividing by said predetermined unit the minimum of values for which probability of loan losses can be regarded substantially zero in the calculation process.

* * * * *